(12) United States Patent
Nomura et al.

(10) Patent No.: US 8,785,535 B2
(45) Date of Patent: Jul. 22, 2014

(54) FIBROUS BASIC MAGNESIUM SULFATE POWDER AND METHOD FOR PRODUCING SAME

(75) Inventors: Ryoichi Nomura, Ube (JP); Tatsuki Okutsu, Ube (JP)

(73) Assignee: Ube Material Industries, Ltd., Yamaguchi (JP)

( * ) Notice: Subject to any disclaimer, the term of this patent is extended or adjusted under 35 U.S.C. 154(b) by 0 days.

(21) Appl. No.: 14/002,414

(22) PCT Filed: Mar. 2, 2012

(86) PCT No.: PCT/JP2012/055388
§ 371 (c)(1),
(2), (4) Date: Sep. 26, 2013

(87) PCT Pub. No.: WO2012/118183
PCT Pub. Date: Sep. 7, 2012

(65) Prior Publication Data
US 2014/0045982 A1    Feb. 13, 2014

(30) Foreign Application Priority Data

Mar. 2, 2011 (JP) ................................ 2011-044856

(51) Int. Cl.
*C01F 5/40*     (2006.01)
*C08K 3/30*     (2006.01)
*C08K 7/02*     (2006.01)
*C08L 101/00*   (2006.01)
*C08K 7/08*     (2006.01)

(52) U.S. Cl.
CPC ............... *C08K 3/30* (2013.01); *C01P 2006/80* (2013.01); *C01P 2004/10* (2013.01); *C08K 7/08* (2013.01); *C08K 7/02* (2013.01); *C01P 2002/82* (2013.01); *C08L 101/00* (2013.01); *C01F 5/40* (2013.01)
USPC ......................................... 524/423; 423/544

(58) Field of Classification Search
CPC ...... C01F 5/40; C08K 3/30; C08K 2003/3063
USPC ......................................... 524/423; 423/544
See application file for complete search history.

(56) References Cited

U.S. PATENT DOCUMENTS

2011/0014470 A1 *   1/2011   Yamamoto et al. ........... 428/402

* cited by examiner

*Primary Examiner* — Peter Szekely
(74) *Attorney, Agent, or Firm* — Nixon Peabody LLP; Jeffrey L. Costellia

(57) ABSTRACT

A fibrous basic magnesium sulfate powder which does not contain $CO_2$ in an amount of more than 0.15% by mass, or a fibrous basic magnesium sulfate powder which has a ratio of the infrared absorption within the wave number range of 1,400-1,440 $cm^{-1}$ relative to the infrared absorption within the wave number range of 3,180-3,530 $cm^{-1}$ of 0.005 or less. The fibrous basic magnesium sulfate powders exhibit improved physical property-improving effect when dispersed in a resin material.

15 Claims, 2 Drawing Sheets

(a)

(b)

(a)

(b)

FIBROUS BASIC MAGNESIUM SULFATE POWDER AND METHOD FOR PRODUCING SAME

FIELD OF THE INVENTION

The present invention relates to a fibrous basic magnesium sulfate powder and a process for preparing the same. The invention further relates to a resin composition containing the fibrous basic magnesium sulfate powder dispersed therein.

BACKGROUND OF THE INVENTION

A fibrous basic magnesium sulfate powder (which is also referred to as fibrous magnesium oxysulfate powder) is widely utilized as a filler for resin materials. A resin composition containing a fibrous basic magnesium sulfate powder dispersed therein generally shows improved physical properties such as improved flexural modulus and improved impact strength.

Japanese Patent Provisional Publication 56-149318 describes a process for preparing a fibrous basic magnesium sulfate powder which comprises the steps of dispersing magnesium hydroxide or magnesium oxide in an aqueous magnesium sulfate solution at a concentration of 25 wt. % or less, and subjecting the resulting dispersion to hydrothermal reaction at a temperature in the range of 100 to 300° C. In this patent publication, there is described a working example in which the resulting product (fibrous basic magnesium particles) is collected on filter and washed with water to obtain a fibrous basic magnesium sulfate powder.

SUMMARY OF THE INVENTION

The fibrous basic magnesium sulfate powder is of value as a filler for resinous materials for improving physical properties of the resinous materials. Therefore, it is requested to further improve its physical property-improving power.

Accordingly, it is the object of the invention to provide a fibrous basic magnesium sulfate powder which shows enhanced physical property-improving power when it is dispersed therein. It is another object of the invention to provide a process which is able to prepare the above-mentioned fibrous basic magnesium sulfate powder. It is a further object to provide a fibrous basic magnesium sulfate powder-containing resin composition which shows improved physical properties such as improved flexural modulus and improved impact strength.

The inventors of the present invention have studied fibrous basic magnesium sulfate powders which are prepared by the conventional methods in connection with their chemical compositions and their physical property-improving powers. As a result, they have discovered that the fibrous basic magnesium sulfate powders prepared by the conventional methods contain carbon dioxide ($CO_2$). They have further discovered that the amount of carbon dioxide contained in the fibrous basic magnesium sulfate powder can be reduced by drying a water-containing fibrous basic magnesium sulfate which is recovered from an aqueous dispersion of fibrous basic magnesium sulfate particles in a dry atmosphere whose $CO_2$ amount is decreased. They have furthermore discovered that the fibrous basic magnesium sulfate powder containing $CO_2$ in a reduced amount shows improved physical property-improving power when it is dispersed in resinous materials.

Accordingly, the present invention provides a fibrous basic magnesium sulfate powder containing $CO_2$ in an amount of not more than 0.15 wt. %.

Preferred embodiments of the invention are described below.

(1) The amount of $CO_2$ is not more than 0.13 wt. %.
(2) The amount of $CO_2$ is in the range of 0.001 to 0.13 wt. %.
(3) A ratio of an amount of infrared rays absorbed in the wave number region of 1,400 to 1,440 $cm^{-1}$ to an amount of infrared rays absorbed in the wave number region of 3,180 to 3,530 $cm^{-1}$ is not more than 0.005.

The present invention further provides a fibrous basic magnesium sulfate powder in which a ratio of an amount of infrared rays absorbed in the wave number region of 1,400 to 1,440 $cm^{-1}$ to an amount of infrared rays absorbed in the wave number region of 3,180 to 3,530 $cm^{-1}$ is not more than 0.005.

Preferred embodiments of the above-mentioned invention are described below.

(1) The ratio is not more than 0.002.
(2) The ratio is in the range of 0.0001 to 0.002.

The fibrous basic magnesium sulfate powders of the inventions can be prepared, for example, by the below-described processes or methods (1) to (3).

(1) A process which comprises the steps of:
recovering fibrous basic magnesium sulfate particles which have been produced by the reaction of magnesium sulfate and a basic compound in an aqueous medium; and
drying the recovered fibrous basic magnesium sulfate particles containing water in a gaseous atmosphere adjusted to contain $CO_2$ gas in an amount of not more than 360 μL per one liter of the volume of the gaseous atmosphere.

(2) A process which comprises the steps of:
producing fibrous basic magnesium sulfate particles by the reaction of magnesium sulfate and a basic magnesium compound selected from the group consisting of magnesium hydroxide and magnesium oxide in an aqueous medium;
recovering fibrous basic magnesium sulfate particles from the aqueous medium to obtain water-containing fibrous magnesium sulfate particles; and
drying the water-containing fibrous basic magnesium sulfate particles in a drying oven adjusted to contain $CO_2$ gas in an amount of not more than 360 μL per one liter of the volume of the drying oven.

(3) A process which comprises the steps of:
producing fibrous basic magnesium sulfate particles by the reaction of a mixture of magnesium sulfate and magnesium hydroxide which has been prepared by adding sodium hydroxide to an aqueous magnesium and magnesium oxide in an aqueous medium;
recovering fibrous basic magnesium sulfate particles from the aqueous medium to obtain water-containing fibrous magnesium sulfate particles; and
drying the water-containing fibrous basic magnesium sulfate particles in a drying oven adjusted to contain $CO_2$ gas in an amount of not more than 360 μL per one liter of the volume of the drying oven.

It is preferred that the above-mentioned processes further comprise a step of washing the recovered water-containing fibrous basic magnesium sulfate particles with a decarboxylated water in advance of the drying step.

The invention further provides a method of drying water-containing fibrous basic magnesium sulfate particles in a drying oven adjusted to contain $CO_2$ gas in an amount of not more than 360 μL per one liter of the volume of the drying oven.

In the above-mentioned method of drying water-containing fibrous basic magnesium sulfate particles, it is also preferred that water of the water-containing fibrous basic magnesium sulfate is a decarboxylated water.

The invention further provides a resin composition containing a fibrous basic magnesium sulfate powder dispersed therein in which the fibrous basic magnesium sulfate powder contains $CO_2$ in an amount of not more than 0.15 wt. %.

The invention furthermore provides a resin composition containing a fibrous basic magnesium sulfate powder dispersed therein in which the fibrous basic magnesium sulfate powder in which a ratio of an amount of infrared rays absorbed in the wave number region of 1,400 to 1,440 $cm^{-1}$ to an amount of infrared rays absorbed in the wave number region of 3,180 to 3,530 $cm^{-1}$ is not more than 0.005.

Effects of the Invention

A resin composition which comprises resin material and the fibrous basic magnesium sulfate powder of the invention shows improved physical properties such as improved flexural strength, improved flexural modulus and improved impact strength. The processes and method according to the invention can be industrially utilized to prepare the fibrous basic sulfate powders whose $CO_2$ content is reduced.

PREFERRED EMBODIMENTS OF THE INVENTION

Figure 1:
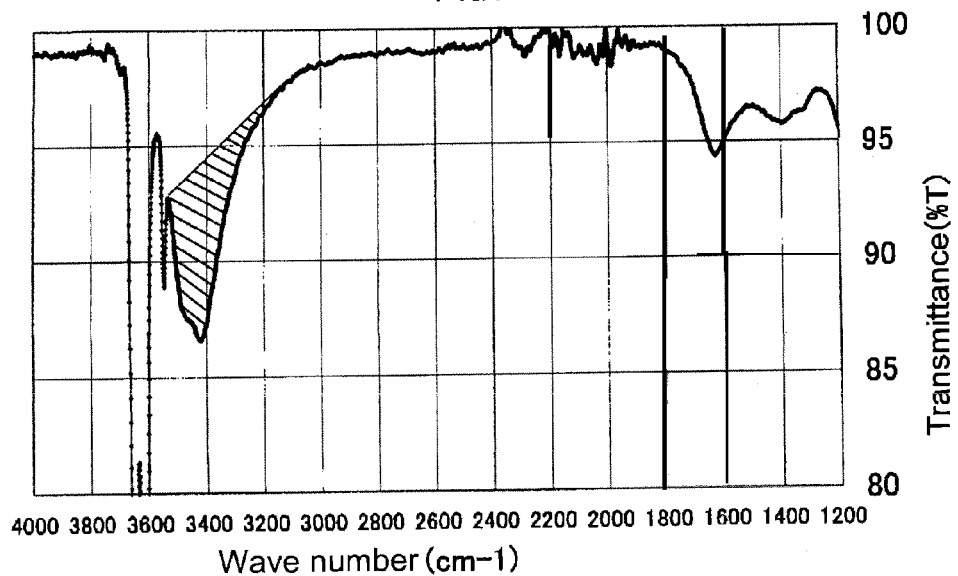
FIG. 1 shows infrared absorption spectra of the fibrous basic magnesium sulfate powder prepared in Example 1, in which (a) is an infrared absorption spectrum in the wave number region of 1,200 to 4,000 $cm^{-1}$, and (b) is an infrared absorption spectrum in the wave number region of 1,390 to 1,450 $cm^{-1}$.
Figure 1:
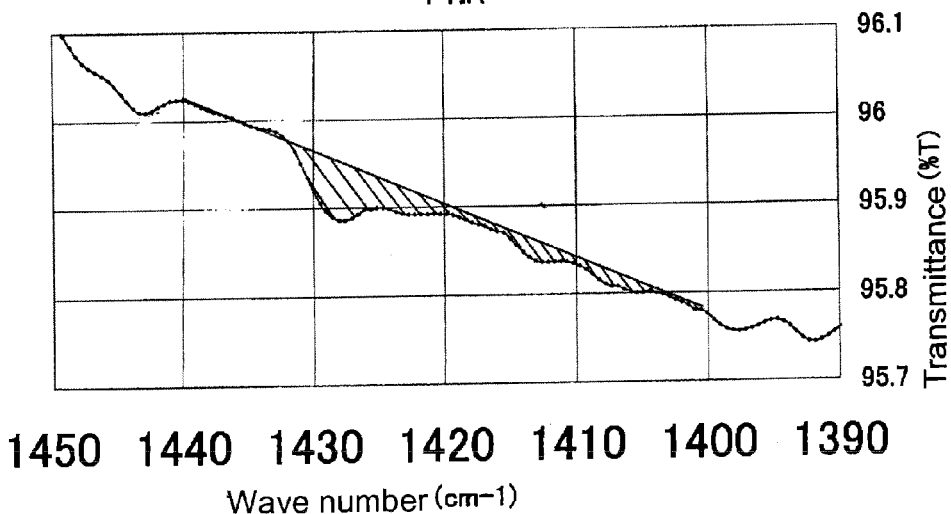

As described hereinbefore, the fibrous basic magnesium sulfate powder of the invention is mainly characterized in that the powder contains a reduced amount of $CO_2$, as compared with the fibrous basic magnesium sulfate powder prepared by the conventional method. The amount of $CO_2$ in the fibrous basic magnesium sulfate powder can be determined by the method comprising the steps of dissolving the fibrous basic magnesium sulfate powder in hydrochloric acid and measuring the amount of $CO_2$ contained in the gaseous composition produced by decomposition of the dissolved fibrous basic magnesium sulfate powder.

The fibrous basic magnesium sulfate powder of the invention contains $CO_2$ (whose amount is determined in the gas produced by its decomposition) of generally 0.15 wt. % or less, preferably 0.13 wt. % or less, more preferably in the range of 0.001 to 0.13 wt. %, most preferably 0.005 to 0.13 wt. %, based on the amount of the fibrous basic magnesium sulfate powder. In other words, the fibrous basic magnesium sulfate powder of the invention does not contain $CO_2$ in an amount exceeding 0.15 wt. %, or the fibrous basic magnesium sulfate powder of the invention contains $CO_2$ in an amount of not more than 0.15 wt. %.

The amount of $CO_2$ contained in the fibrous basic magnesium sulfate powder can be evaluated by a ratio of an amount of infrared rays absorbed by carbonyl groups of the fibrous basic magnesium sulfate powder to an amount of infrared rays absorbed by hydroxyl groups thereof (i.e., amount of infrared rays assigned to carbonyl groups/amount of infrared rays assigned to hydroxyl groups). The amount of infrared rays absorbed by the hydroxyl groups can be obtained by determining the amount of infrared rays absorbed in the wave number region of 3,180 to 3,530 $cm^{-1}$. The absorption of infrared rays in this wave number region is assigned to the stretching vibration of hydroxyl group. The amount of infrared rays absorbed by the carbonyl groups can be obtained by determining the amount of infrared rays absorbed in the wave number region of 1,400 to 1,440 $cm^{-1}$.

The amount of the infrared absorption of each of hydroxyl group and carbonyl group can be determined from an infrared absorption spectrum obtained by Fourier Transform Infrared (FT-IR) spectroscopy according to ATR method. The ATR method is performed by applying infrared rays onto a surface of solid sample via a prism closely placed on the solid sample surface and detecting the total reflection of the applied infrared rays on the solid sample surface, whereby obtaining an infrared spectrum. The prism should have a refractive index higher than that of the solid sample. Since the refractive index of the fibrous basic magnesium sulfate powder is 1.53, the prism can be a diamond prism (refractive index: 2.4, angle of incidence: 45°). The infrared absorption spectrum of the fibrous basic magnesium sulfate powder can be obtained by means of the ATR method. The method for determining the infrared absorption from the infrared spectrum will be described in the working examples.

The fibrous basic magnesium sulfate powder of the invention shows the ratio of the infrared absorption assigned to carbonyl groups to the infrared absorption assigned to hydroxyl groups, namely, a ratio of the infrared absorption in the wave number region of 1,400 to 1,440 $cm^{-1}$ to an amount of infrared rays absorbed in the wave number region of 3,180 to 3,530 $cm^{-1}$ is generally not more than 0.005, preferably not more than 0.002, more preferably in the range of 0.0001 to 0.002.

The fibrous basic magnesium sulfate powder comprises fibrous basic magnesium sulfate particles. The fibrous basic magnesium sulfate particles can be in the form of particulate or granules. The fibrous basic magnesium sulfate particles preferably has a mean length in the range of 1.0 to 100 μm, more preferably in the range of 1.0 to 50 μm. The mean thickness is preferably in the range of 0.1 to 3.0 μm, more preferably 0.1 to 1.0 μm. The mean aspect ratio (mean length/mean thickness) is preferably 3 or more, more preferably in the range of 5 to 50. The mean length and mean thickness of the fibrous basic magnesium particles can be determined from an enlarged SEM (Scanning Electron Microscope) image.

The fibrous basic magnesium sulfate powder of the invention can be prepared by the methods described hereinafter.

The fibrous basic magnesium sulfate particles can be prepared by the known methods. In other words, the fibrous basic magnesium sulfate particles can be produced by the reaction of magnesium sulfate and a basic compound in an aqueous medium. Examples of the basic compound include basic magnesium compounds such as magnesium hydroxide and magnesium oxide. The procedure for producing fibrous basic magnesium sulfate particles can be performed by reacting an aqueous mixture obtained by adding magnesium hydroxide and/or magnesium oxide to an aqueous magnesium sulfate solution or an aqueous mixture of magnesium sulfate and magnesium hydroxide prepared by adding sodium hydroxide to an aqueous magnesium sulfate solution. Seed crystals of fibrous basic magnesium sulfate can be placed in the aqueous medium in advance of performing the reaction. If the produced fibrous basic magnesium sulfate particles are partially connected and aggregated to form aggregated particles in the form of fan or cocoon, the aggregated particles are preferably disintegrated to give fibrous particles. The reaction can be carried out generally at a temperature in the range of 90 to 200° C. and at a pressure from atmospheric pressure to 2 MPa. The aqueous medium employed for the method for producing the fibrous basic magnesium sulfate particles can be decarboxylated.

The fibrous basic magnesium sulfate particles produced in the aqueous medium are then recovered from the aqueous mixture to give water-containing fibrous basic magnesium sulfate particles. The fibrous basic magnesium sulfate particles can be recovered from the aqueous mixture by known solid-liquid separation methods such as filtration, centrifuge and decantation. The water-containing fibrous basic magnesium sulfate particles generally have a water content in the range of 40 to 80 wt. %.

Subsequently, the water-containing fibrous basic magnesium sulfate particles are dried to give the fibrous basic magnesium sulfate powder. The drying procedure can be carried out in a drying oven in which $CO_2$ content per one liter of the volume of oven is reduced to 360 μL or less, preferably 200 μL or less, more preferably 100 μL or less. Since the water-containing fibrous basic magnesium sulfate particles are dried in an atmosphere having the low $CO_2$ gas content, the $CO_2$ content of the resulting fibrous basic magnesium sulfate powder is reduced. In consideration of this fact, $CO_2$ is incorporated into the resulting fibrous basic magnesium sulfate powder in the below-described manner.

When the water-containing fibrous basic magnesium sulfate particles are dried in a drying oven, the $CO_2$ gas present in the oven is dissolved in the water portion of the water-containing fibrous basic magnesium sulfate particles to produce carbonate ions. Further, the water portion in which $CO_2$ gas is dissolved turns acidic. In the acidic water portion, Mg ions are released from the fibrous basic magnesium sulfate particles. The carbonate ion and Mg ion in the water portion are considered to form together magnesium hydrogen carbonate [$Mg(HCO_3)_2$], which is deposited in the form of a carbonate such as magnesium carbonate or basic magnesium carbonate.

The $CO_2$ content in the oven can be reduced by introducing a low $CO_2$ content gas into the oven or reducing the gaseous pressure in the oven. The $CO_2$ gas content in atmospheric air is 400 μL/L. The above-mentioned low $CO_2$ content gas can be air which is subjected to certain $CO_2$ gas removing procedure. The temperature inside of the oven generally is in the range of 100 to 200° C., and the drying period generally is in the range of 1 to 48 hours.

It is preferred to reduce the carbonate ion content in the water portion of the water-containing fibrous basic magnesium sulfate particles in advance of subjecting the water-containing fibrous basic magnesium sulfate particles to the drying procedure. The reduction of the carbonate ion content can be performed by washing the water-containing fibrous basic magnesium sulfate particles with decarboxylated water. The decarboxylated water can be produced by boiling the water to remove $CO_2$ gas, by the process comprising steps of adding an acid such as sulfuric acid to the water so as to adjust the pH of water to a level of 4 or lower, babbling the water to remove the resulting $CO_2$ gas, and neutralizing the water with an alkali such as ammonia, or by fixing the carbonate ions in the form of calcium carbonate by the addition of calcium hydroxide. The decarboxylated water generally has a carbonate ion content of 30 mg/L or lower, preferably 10 mg/L or lower, more preferably 1 mg/L or lower.

The water-containing fibrous basic magnesium sulfate particles can be made in the granular form before the particles are subjected to the drying procedure.

The fibrous basic magnesium sulfate powder of the invention can be advantageously employed as a filler for resin materials. The fibrous basic magnesium sulfate powder of the invention shows enhanced physical property-improving power, as compared with the fibrous basic magnesium sulfate powders produced by the conventional methods. This enhanced physical property-improving power can be explained below.

In the procedures of recovering fibrous basic magnesium sulfate particles from the aqueous reaction mixture and drying the recovered fibrous basic magnesium sulfate particles which are generally performed in the process of preparing a fibrous basic magnesium sulfate powder, the water present on the particles are tend to remain in the area where the fibrous particles are kept in contact with each other. Therefore, the carbonate such as magnesium carbonate deposits predominantly in the area where the fibrous particles are kept in contact with each other. The carbonate deposited in the area where the fibrous particles are kept in contact with each other functions as a binding agent for connecting the adjoining fibrous particles. The aggregate of the fibrous particles which are connected with each other by means of the carbonate is not easily dispersed in resin material in the mixing procedure.

In contrast, the fibrous basic magnesium sulfate powder of the invention contains aggregated particles in a less amount, as compared with the fibrous basic magnesium sulfate powders prepared by the conventional procedures. Therefore, the fibrous basic magnesium sulfate powder of the invention is evenly dispersed in the resin material in the form of fibrous particles. As a result, the fibrous basic magnesium sulfate powder of the invention shows enhanced resin physical property-improving power.

It is generally performed that a lubricant such as a fatty acid or a metal salt of a fatty acid is incorporated into resin material when an inorganic filler such as a fibrous basic magnesium sulfate powder. It is known that the hydroxyl group shows high affinity to the fatty acid or salt thereof, as compared with the carboxyl group. Accordingly, the fibrous basic magnesium sulfate powder of the invention shows high affinity to the lubricant, as compared with the conventional fibrous basic magnesium sulfate powders. For this reason, the fibrous basic magnesium sulfate powder of the invention may show further enhanced resin physical property-improving power.

The fibrous basic magnesium sulfate powder of the invention can be incorporated and dispersed in a resin composition in an amount of 2 to 20 wt. %, preferably 2 to 15 wt. %, based on the total amount of the resin composition. Examples of the resin materials include olefinic polymers such as ethylene polymer, propylene polymer and ethylene-propylene copolymer.

The resin composition preferably contains a lubricant. The lubricant preferably is a fatty acid or a salt thereof. The fatty acid preferably has 12-22 carbon atoms. The fatty acid can be a saturated fatty acid or an unsaturated fatty acid. Examples of the saturated fatty acid include lauric acid, tridecylic acid, myristic acid, pentadecylic acid, palmitic acid, margaric acid, stearic acid, nonadecylic acid, arachidic acid, and behenic acid. Examples of the unsaturated fatty acid include myristoleic acid, palmitoleic acid, oleic acid, elaidic acid, vaccenic acid, gadoleic generally in an amount of 1 to 30 weight parts per 100 weight parts of the fibrous basic magnesium sulfate powder.

The resin composition may further contain other resin physical property improving agents such as oxidation inhibitors, UV absorbers, pigments, antistatic agents, corrosion inhibitors, flame retardants, neutralizing agents, forming agents, plasticizers, deforming agents and cross-linking agents.

The resin composition can be produced, for example, by mixing and kneading a resin material and the fibrous basic magnesium sulfate powder, and optionally a lubricant and other physical property-improving additives. The resin composition also can be produced by first preparing a master batch which comprises a resin material and the fibrous basic magnesium sulfate powder in a high concentration such as 35 to 80 wt. %, and then mixing and kneading the master batch with a resin material.

The thus produced resin composition can be converted in the form of resin article by means of known molding procedures such as injection molding, extrusion molding, vacuum molding and expansion molding.

EXAMPLES

Example 1

(1) Production of Water-containing Fibrous Basic Magnesium Sulfate Particles

To 12.5 L of aqueous magnesium sulfate which was prepared by dissolving magnesium sulfate heptahydrates in water to give an aqueous solution (concentration: 3 mol/L) was added 500 g of powdery magnesium hydroxide, and the mixture was stirred. The resulting aqueous mixture was placed in an autoclave and subjected to hydrothermal reaction at 160° C. and 0.58 MPa (6 kgf/cm$^2$) for 2 hours, to produce fibrous basic magnesium sulfate particles. To the aqueous mixture containing the produced fibrous basic magnesium sulfate particles was added 12.5 L of water, and the mixture was stirred and uniformly mixed to give an aqueous slurry of fibrous basic magnesium sulfate particles (solid content: 2.0 wt. %). The resulting slurry was filtered in a Buchner funnel under reduced pressure to obtain 1.5 kg of water-containing fibrous basic magnesium sulfate particles. The obtained water-containing fibrous particles were washed with 10 L of industrial water (carbonate ion concentration: 53 mg/L) and molded in an extrusion granule-forming machine to give granules having a diameter of 2.4 mm. The resulting fibrous basic magnesium sulfate granules had a water content of 66.7 wt. %.

(2) Preparation of Fibrous Basic Magnesium Sulfate Powder

The water-containing fibrous basic magnesium sulfate granules (1.2 kg) were placed in a box-type drying oven (volume: 64 L). Stream of air whose $CO_2$ gas concentration was reduced to a level of not more than 100 μL (prepared by passing environmental air into a column charged with granular soda lime for removing $CO_2$ from the air) was passed into the dryer at a flow rate of 10 L/min., and under such conditions the water-containing fibrous magnesium sulfate granules were heated to 160° C. for 24 hours for drying. The thus obtained fibrous basic magnesium sulfate powder had a mean length of 12.0 μm, a mean thickness of 0.60 μm, and a mean aspect ratio of 20.

The fibrous basic magnesium sulfate powder was subjected to determinations of the $CO_2$ content and the ratio of infrared absorption of carboxyl group to infrared absorption of hydroxyl group in the below-described manner. The results of determinations are set forth in Table 1.

[Determination of $CO_2$ Content]

The sample of fibrous basic magnesium sulfate powder is dissolved in hydrochloric acid, and the produced decomposition gas is collected by a gas bullet of an Orsat apparatus. The collected decomposition gas is brought into contact with an aqueous sodium hydroxide solution so that $CO_2$ gas in the decomposition gas was absorbed by the aqueous sodium hydroxide solution. The volume (mL) of the decomposition gas from which $CO_2$ is removed by the absorption by the aqueous sodium hydroxide solution was determined. The decrease of the volume of the decomposition gas corresponds to the amount of $CO_2$ in the originally collected decomposition gas. The thus obtained volume of $CO_2$ in the originally collected decomposition gas was converted to a weight of $CO_2$. In this manner, the amount (wt. %) of $CO_2$ in the sample of fibrous magnesium sulfate powder is determined.

[Determination of Ratio of Infrared Absorption of Carboxyl Group to Infrared Absorption of Hydroxyl Group]

A sample of fibrous basic magnesium sulfate powder is placed in a Fourier Transform Infrared spectroscopic apparatus (FT/IR-6100 type A, available from Japan Spectroscopy, Co., Ltd.) equipped with a total reflection apparatus (PRO 470-H, available from Japan Spectroscopy, Co., Ltd., diamond prism (refractive index: 2.4, angle of incidence: 45°)), and an infrared absorption spectrum of the sample is obtained. In the infrared absorption spectrum, the transmittance at 3,180 cm$^{-1}$ and that at 3,530 cm$^{-1}$ are connected with each other by a straight line. The infrared absorption of hydroxyl group in the wave number region of 3,180 cm$^{-1}$ to 3,530 cm$^{-1}$ is obtained from the area surrounded by the thus prepared straight line and the infrared absorption curve in the wave number region of 3,180 cm$^{-1}$ to 3,530 cm$^{-1}$. In the same manner, the transmittance at 1,400 cm$^{-1}$ and that at 1,440 cm$^{-1}$ are connected with each other by a straight line. The infrared absorption of carboxyl group in the wave number region of 1,400 cm$^{-1}$ to 1,440 cm$^{-1}$ is obtained from the area surrounded by the thus prepared straight line and the infrared absorption curve in the wave number region of 1,400 cm$^{-1}$ to 1,440 cm$^{-1}$. The thus obtained infrared absorptions are placed in the below-mentioned formula to determine the ratio of infrared absorption of carboxyl group to infrared absorption of hydroxyl group.

Ratio of infrared absorptions=Infrared absorption of carboxyl group/Infrared absorption of hydroxyl group (3) Manufacture of Fibrous Basic Magnesium Sulfate Particle-containing Resin Composition and Evaluation of Physical Properties Thereof 90 weight parts of propylene polymer [MFR (temperature: 230° C., load: 2.16 kg):49.4 g/10 min.], 10 weight parts of the fibrous basic magnesium sulfate powder prepared in (2) above, 1.47 weight parts of magnesium stearate, and 0.2 weight part of an oxidation inhibitor (0.1 weight part of Irgafos and 0.1 weight part of Irganox, both available from BASF Japan, Ltd.) were blended under dry conditions in a tumbler. The resulting mixture was fused and kneaded in a twin screw extrude at 200° C., to manufacture an extended strand. The extended strand was cooled with ice-water and cut in a strand cutter to give pellets. The pellets were placed in an injection apparatus to give test pieces of the fibrous basic magnesium sulfate powder-containing resin composition.

The test pieces were subjected to measurements of flexural strength, flexural modulus and Izod impact strength. The results of measurements are set forth in Table 1.

Flexural strength: measured by a method according to ASTM-D790

Flexural modulus: measured by a method according to ASTM-D790

Izod impact strength: measured by a method (with notch, measured at −30° C.) according to ASTM-D256

Example 2

A fibrous basic magnesium sulfate powder was prepared in the manner described in Example 1 except that the procedure (1) for the production of fibrous basic magnesium sulfate granules was modified as follows:

the slurry of fibrous basic magnesium sulfate particles was filtered under reduced pressure with application of a low $CO_2$ content air which had a $CO_2$ content of 100 μL to the slurry; and the water-containing fibrous basic magnesium sulfate particles were washed with a low carbonate ion content water (carbonate ion concentration: not more than 0.1 mg/L) which was prepared by boiling industrial water for 30 minutes for decarboxylation and cooled to room temperature under tightly sealed conditions.

The resulting fibrous basic magnesium sulfate powder was blended with the resin material and processed in the same manner to give a fibrous basic magnesium sulfate powder-containing resin composition.

The $CO_2$ content and ratio of infrared absorption of carboxyl group to infrared absorption of hydroxyl group are set forth in Table 1. In Table 1, the flexural strength, flexural modulus and Izod impact strength of the resulting fibrous basic magnesium sulfate powder-containing resin composition are also set forth.

Example 3

A fibrous basic magnesium sulfate powder was prepared in the manner described in Example 1 except that the procedure (2) for the preparation of fibrous basic magnesium sulfate powder was modified as follows:

the water-containing fibrous basic magnesium sulfate granules were dried in a stream of air (which had $CO_2$ concentration of 200 μL/L and prepared by mixing atmospheric air and the low $CO_2$ content air) at a rate of 10 L/min.

The resulting fibrous basic magnesium sulfate powder was blended with the resin material and processed in the same manner to give a fibrous basic magnesium sulfate powder-containing resin composition.

The $CO_2$ content and ratio of infrared absorption of carboxyl group to infrared absorption of hydroxyl group are set forth in Table 1. In Table 1, the flexural strength, flexural modulus and Izod impact strength of the resulting fibrous basic magnesium sulfate powder-containing resin composition are also set forth.

Example 4

A fibrous basic magnesium sulfate powder was prepared in the manner described in Example 1 except that the procedure (2) for the preparation of fibrous basic magnesium sulfate powder was modified as follows:

the water-containing fibrous basic magnesium sulfate granules were dried in a stream of air (which had $CO_2$ concentration of 300 μL/L and prepared by mixing atmospheric air and the low $CO_2$ content air) at a rate of 10 L/min.

The resulting fibrous basic magnesium sulfate powder was blended with the resin material and processed in the same manner to give a fibrous basic magnesium sulfate powder-containing resin composition.

The $CO_2$ content and ratio of infrared absorption of carboxyl group to infrared absorption of hydroxyl group are set forth in Table 1. In Table 1, the flexural strength, flexural modulus and Izod impact strength of the resulting fibrous basic magnesium sulfate powder-containing resin composition are also set forth.

Comparison Example 1

A fibrous basic magnesium sulfate powder was prepared in the manner described in Example 1 except that the procedure (2) for the preparation of fibrous basic magnesium sulfate powder was modified as follows:

the water-containing fibrous basic magnesium sulfate granules were dried in the box type dryer in a stream of atmospheric air ($CO_2$ concentration: 400 μL/L) at a rate of 10 L/min.

The resulting fibrous basic magnesium sulfate powder was blended with the resin material and processed in the same manner to give a fibrous basic magnesium sulfate powder-containing resin composition.

The $CO_2$ content and ratio of infrared absorption of carboxyl group to infrared absorption of hydroxyl group are set forth in Table 1. In Table 1, the flexural strength, flexural modulus and Izod impact strength of the resulting fibrous basic magnesium sulfate powder-containing resin composition are also set forth.

TABLE 1

| | Property of of Fibrous powder | | Property of Fibrous powder-containing resin composition | | |
|---|---|---|---|---|---|
| | $CO_2$ con. (wt. %) | IR absorp. ratio | Flexural strength (MPa) | Flexural modulus (MPa) | Izod strength (J/m) |
| Example 1 | 0.07 | 0.00099 | 51.5 | 3482 | 26.5 |
| Example 2 | 0.01 | 0.00037 | 52.7 | 3574 | 27.0 |
| Example 3 | 0.10 | 0.00112 | 51.5 | 3353 | 26.2 |
| Example 4 | 0.13 | 0.00165 | 50.0 | 3332 | 25.7 |
| Com. Ex. 1 | 0.16 | 0.00777 | 49.0 | 3317 | 22.6 |

Remarks:

Property of Fibrous powder means the physical property of the fibrous basic magnesium sulfate powder Property of Fibrous powder-containing resin composition means the physical property of the fibrous basic magnesium sulfate powder-containing resin composition IR absorp. ratio means the infrared absorption ratio Izod strength means the Izod impact strength As is apparent from the results set forth in Table 1, the resin compositions containing a fibrous basic magnesium sulfate powder having a less $CO_2$ content and the lower ratio of infrared absorption caused by carboxyl group/infrared absorption caused by hydroxyl group shows higher values in all of the flexural strength, flexural modulus and Izod impact strength.

FIG. 1 shows infrared absorption spectra of the fibrous basic magnesium sulfate powder prepared in Example 1, in which (a) is an infrared absorption spectrum in the wave number region of 1,200 to 4,000 $cm^{-1}$, and (b) is an infrared absorption spectrum in the wave number region of 1,390 to 1,450 $cm^{-1}$. The shadow area with oblique lines in (a) corresponds to the infrared absorption caused by hydroxyl group, while the shadow area with oblique lines in (b) corresponds to the infrared absorption caused by carboxyl group.

Figure 2:
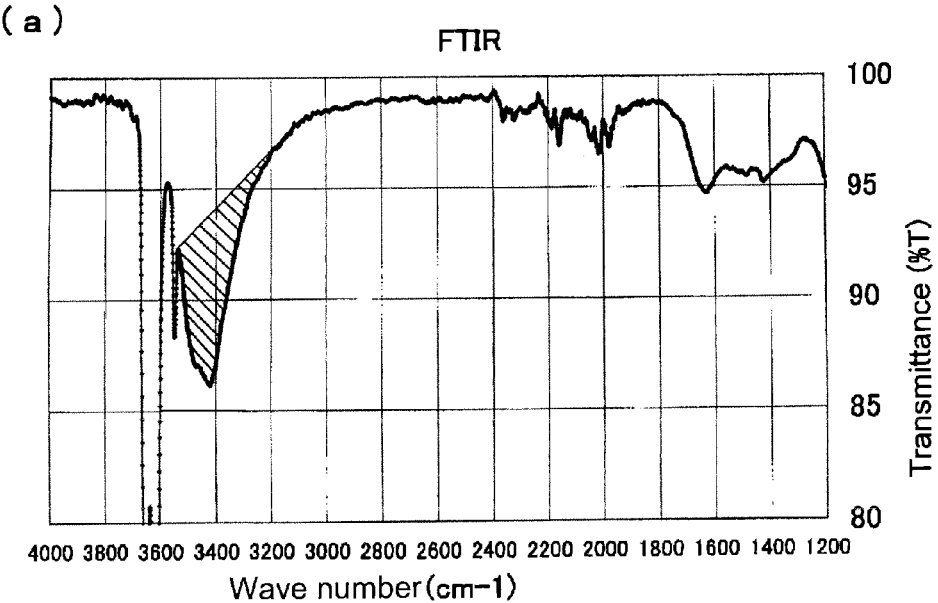
FIG. 2 shows infrared absorption spectra of the fibrous basic magnesium sulfate powder prepared in Comparison Example 1, in which (a) is an infrared absorption spectrum in the wave number region of 1,200 to 4,000 $cm^{-1}$ and (b) is an infrared absorption spectrum in the wave number region of 1,390 to 1,450 $cm^{-1}$.
Figure 2:
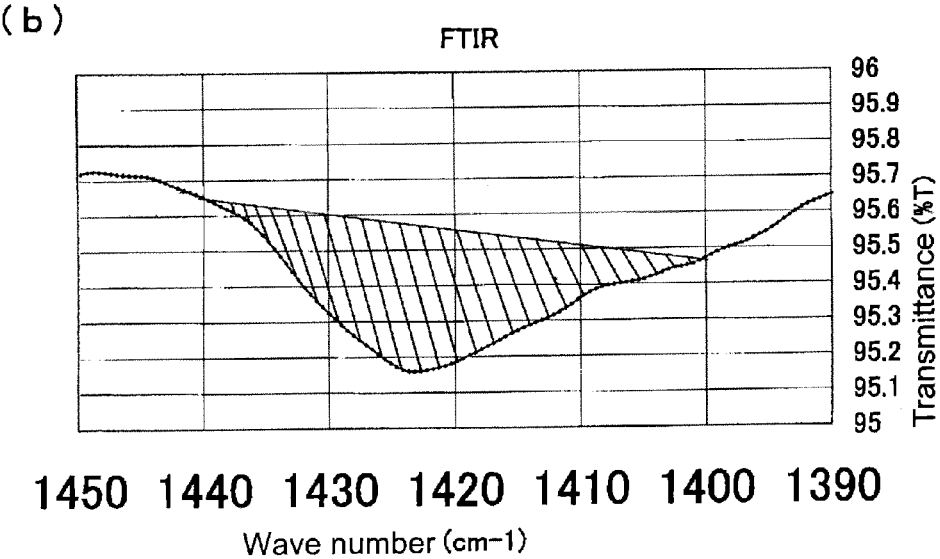

FIG. 2 shows infrared absorption spectra of the fibrous basic magnesium sulfate powder prepared in Comparison Example 1, in which (a) is an infrared absorption spectrum in the wave number region of 1,200 to 4,000 $cm^{-1}$, and (b) is an infrared absorption spectrum in the wave number region of 1,390 to 1,450 cm$^{-1}$. The shadow area with oblique lines in (a) corresponds to the infrared absorption caused by hydroxyl group, while the shadow area with oblique lines in (b) corresponds to the infrared absorption caused by carboxyl group.

Comparison between FIG. 1 and FIG. 2 indicates that the fibrous basic magnesium sulfate powder obtained in Example 1 shows prominently low infrared absorption in the wave number region of 1,400 to 1,440 cm$^{-1}$, which is caused by the presence of carboxyl groups.

What is claimed is:

1. A fibrous basic magnesium sulfate powder containing $CO_2$ in an amount of not more than 0.15 wt. %.

2. The fibrous basic magnesium sulfate powder of claim 1, in which the amount of $CO_2$ is not more than 0.13 wt. %.

3. The fibrous basic magnesium sulfate powder of claim 2, in which the amount of $CO_2$ is in the range of 0.001 to 0.13 wt. %.

4. The fibrous basic magnesium sulfate powder of claim 1, in which a ratio of an amount of infrared rays absorbed in the wave number region of 1,400 to 1,440 cm$^{-1}$ to an amount of infrared rays absorbed in the wave number region of 3,180 to 3,530 cm$^-$ is not more than 0.005.

5. A fibrous basic magnesium sulfate powder in which a ratio of an amount of infrared rays absorbed in the wave number region of 1,400 to 1,440 cm$^-$ to an amount of infrared rays absorbed in the wave number region of 3,180 to 3,530 cm$^{-1}$ is not more than 0.005.

6. The fibrous basic magnesium sulfate powder of claim 5, in which the ratio is not more than 0.002.

7. The fibrous basic magnesium sulfate powder of claim 6, in which the ratio is in the range of 0.0001 to 0.002.

8. A process for preparing a fibrous basic magnesium sulfate powder of claim 1 which comprises the steps of:
recovering fibrous basic magnesium sulfate particles which have been produced by the reaction of magnesium sulfate and a basic compound in an aqueous medium; and
drying the recovered fibrous basic magnesium sulfate particles containing water in a gaseous atmosphere adjusted to contain $CO_2$ gas in an amount of not more than 360 μL per one liter of the volume of the gaseous atmosphere.

9. The process of claim 8, which further comprises a step of washing the recovered water-containing fibrous basic magnesium sulfate particles with a decarboxylated water in advance of the drying step.

10. A process for preparing a fibrous basic magnesium sulfate powder of claim 1 which comprises the steps of:
producing fibrous basic magnesium sulfate particles by the reaction of magnesium sulfate and a basic magnesium compound selected from the group consisting of magnesium hydroxide and magnesium oxide in an aqueous medium;
recovering fibrous basic magnesium sulfate particles from the aqueous medium to obtain water-containing fibrous magnesium sulfate particles; and
drying the water-containing fibrous basic magnesium sulfate particles in a drying oven adjusted to contain $CO_2$ gas in an amount of not more than 360 μL per one liter of the volume of the drying oven.

11. A process for preparing a fibrous basic magnesium sulfate powder of claim 1 which comprises the steps of:
producing fibrous basic magnesium sulfate particles by the reaction of a mixture of magnesium sulfate and magnesium hydroxide which has been prepared by adding sodium hydroxide to an aqueous magnesium sulfate and magnesium oxide in an aqueous medium;
recovering fibrous basic magnesium sulfate particles from the aqueous medium to obtain water-containing fibrous magnesium sulfate particles; and
drying the water-containing fibrous basic magnesium sulfate particles in a drying oven adjusted to contain $CO_2$ gas in an amount of not more than 360 μL per one liter of the volume of the drying oven.

12. A method for preparing a fibrous basic magnesium sulfate powder which comprises drying water-containing fibrous basic magnesium sulfate particles in a drying oven adjusted to contain $CO_2$ gas in an amount of not more than 360 μL per one liter of the volume of the drying oven.

13. The method of claim 12, in which the water contained in the water-containing fibrous basic magnesium sulfate particles is decarboxylated water.

14. A resin composition containing a fibrous basic magnesium sulfate powder dispersed therein in which the fibrous basic magnesium sulfate powder contains $CO_2$ in an amount of not more than 0.15 wt. %.

15. A resin composition containing a fibrous basic magnesium sulfate powder dispersed therein in which the fibrous basic magnesium sulfate powder in which a ratio of an amount of infrared rays absorbed in the wave number region of 1,400 to 1,440 cm$^-$ to an amount of infrared rays absorbed in the wave number region of 3,180 to 3,530 cm$^-$ is not more than 0.005.

* * * * *